United States Patent [19]

Suzuki et al.

[11] Patent Number: 5,222,057
[45] Date of Patent: Jun. 22, 1993

[54] TRACKING SERVO METHOD USED IN AN OPTICAL DISK DRIVE UNIT

[75] Inventors: Haruyuki Suzuki, Kawasaki; Toshihiro Shigemori, Machida, both of Japan

[73] Assignee: Ricoh Company, Ltd., Tokyo, Japan

[21] Appl. No.: 624,885

[22] Filed: Dec. 3, 1990

[30] Foreign Application Priority Data

Dec. 15, 1989 [JP] Japan .................................. 1-325190

[51] Int. Cl.$^5$ ................................................ G11B 7/00
[52] U.S. Cl. ............................... 369/44.26; 369/44.41; 369/44.34
[58] Field of Search ............... 369/44.26, 44.13, 44.28, 369/44.27, 44.29, 32, 44.25, 109, 111, 44.41, 44.42, 44.34, 44.36; 360/78.04, 78.11, 77.05

[56] References Cited

U.S. PATENT DOCUMENTS

| | | | |
|---|---|---|---|
| 4,779,251 | 10/1988 | Burroughs | 369/44.26 |
| 4,779,253 | 10/1988 | Getreuer et al. | 369/44.26 |
| 4,951,275 | 8/1990 | Saitoh et al. | 369/44.41 |
| 4,967,403 | 10/1990 | Ogawa et al. | 369/44.26 |
| 5,079,756 | 1/1992 | Kuwabara | 369/44.27 |
| 5,144,609 | 9/1992 | Takeda et al. | 369/44.41 |

FOREIGN PATENT DOCUMENTS 64-13233 1/1989 Japan .

*Primary Examiner*—Aristotelis Psitos
*Assistant Examiner*—Nabil Hindi
*Attorney, Agent, or Firm*—Cooper & Dunham

[57] ABSTRACT

A tracking servo method in an optical disk drive unit has the steps of providing a signal in accordance with a different in voltage level between two signals respectively reproduced from a pair of tracking sample flags arranged in positions shifted by predetermined distances from a tracking center on an optical disk; setting the signal in accordance with the voltage level difference to a tracking error signal; and positioning a light spot on the optical disk in the tracking center using the tracking error signal. The tracking servo method further has the step of normalizing the tracking error signal by a signal indicative of a difference between an average value of the two reproducing signals and a signal reproduced from a sample flag approximately arranged in the tracking center on the optical disk.

1 Claim, 2 Drawing Sheets

TRACKING SERVO METHOD USED IN AN OPTICAL DISK DRIVE UNIT

BACKGROUND OF THE INVENTION

1. Field of the Invention

The present invention relates to a tracking servo method in an optical disk drive unit including a magnetooptic disk drive unit.

2. Description of the Related Art

In a general tracking servo method, a sum of respective amplitudes of reproducing signals is considered to be proportional to a tracking error signal. This tracking error signal is normalized by this sum to constantly hold a gain of the tracking error signal. However, there is a case in which this sum is not necessarily proportional to the tracking error signal. For example, when clock sample flags extend in the circumferential direction of an optical disk, their spatial frequencies in the circumferential direction of the optical disk are reduced so that the amplitudes of the reproducing signals are increased. However, the magnitude of the tracking error signal depends on the spatial frequencies of the clock sample flags on the optical disk in the radial direction thereof so that no magnitude of the tracking error signal is almost changed. The relation between the tracking error signal and the above sum is also changed by the shape and depth of pits forming the clock sample flags, or aberration characteristics of the light spot. Accordingly, a normalized tracking error signal is not necessarily constant at any time so that the gain of the tracking servo loop is changed.

SUMMARY OF THE INVENTION

It is therefore an object of the present invention to provide a tracking servo method in which a constant gain of a tracking error signal is provided even when the optical characteristics of clock sample flags and a reproducing optical system are changed.

The above object of the present invention can be achieved by a tracking servo method in an optical disk drive unit comprising the steps of providing a signal in accordance with a difference in voltage level between two signals respectively reproduced from a pair of tracking sample flags arranged in positions shifted by predetermined distances from a tracking center on an optical disk; setting the signal in accordance with the voltage level difference to a tracking error signal; and positioning a light spot on the optical disk in the tracking center using the tracking error signal; the tracking servo method further comprising the step of normalizing the tracking error signal by a signal indicative of a difference between an average value of the two reproducing signals and a signal reproduced from a sample flag approximately arranged in the tracking center on the optical disk.

In accordance with the above structure, a constant gain of the tracking error signal is provided even when the optical characteristics of clock sample flags and a reproducing optical system are changed.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a tracking servo method in the present invention will next be described in detail with reference to the accompanying drawings.

Figure 1A:
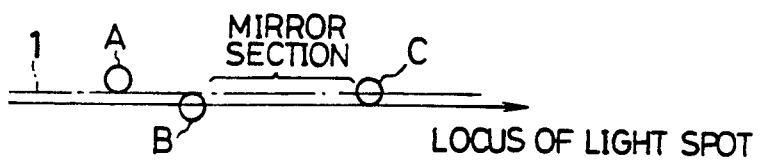
FIGS. 1a and 1b are respectively views of an optical disk and a quantity of light reflected therefrom for explaining a general tracking servo method.
Figure 1B:
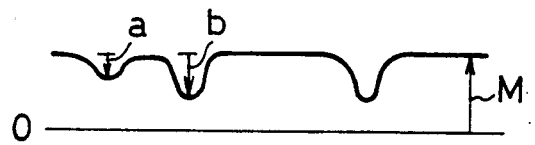

As shown in FIGS. 1a and 1b, in an optical disk drive unit using a sampling servo system, a pair of tracking sample flags A and B are buried in positions shifted by predetermined distances from a tracking center 1 on sides thereof opposite to each other in each center of a track on an optical disk. A clock sample flag C is buried in a tracking center on the optical disk. A small light spot is irradiated by an optical pickup onto this optical disk to obtain a reproducing signal in accordance with a quantity of light reflected from the optical disk. This reproducing signal is sampled in a position corresponding to each of the tracking sample flags A and B. A tracking error signal is provided by a difference between sampling values a and b corresponding to the tracking sample flags A and B. A tracking servo control operation is performed by this tracking error signal so that the optical pickup or a portion thereof is moved in a radial direction of the optical disk. Thus, the above light spot is positioned in the tracking center 1 on the optical disk. When this tracking servo control operation is correctly performed, the tracking center 1 is approximately scanned by the light spot and the sampling values a and b are approximately equal to each other. The clock sample flag C is generally used to extract a timing for sampling reproducing signals from the tracking sample flags A and B, the clock sample flag C, and a flag showing unillustrated data on a track of the optical disk. In FIG. 1b, reference numeral M designates an amplitude of each of the reproducing signals with respect to a mirror section of the optical disk.

Circumferential lengths of clock sample flags A and B are different from each other in inner and outer circumferential portions of the optical disk. Accordingly, the amplitude values of reproducing signals a and b corresponding to the clock sample flags A and B are different from each other. Therefore, tracking error signals in the inner and outer circumferential portions of the optical disk are different from each other so that the gain of a tracking servo loop is changed.

To avoid such a problem, in the tracking servo method, the gain of an amplifier within the tracking servo loop is controlled such that a sum of respective amplitudes of the reproducing signals a and b is constant. Otherwise, the tracking error signal is divided by the sum of the respective amplitudes of the reproducing signals a and b. Thus, the tracking error signal is normalized to constantly hold the gain of the tracking servo loop. Such a tracking servo method is shown in e.g., Japanese Patent Application Laying Open (KOKAI) No. 64-13233.

Figure 2A:
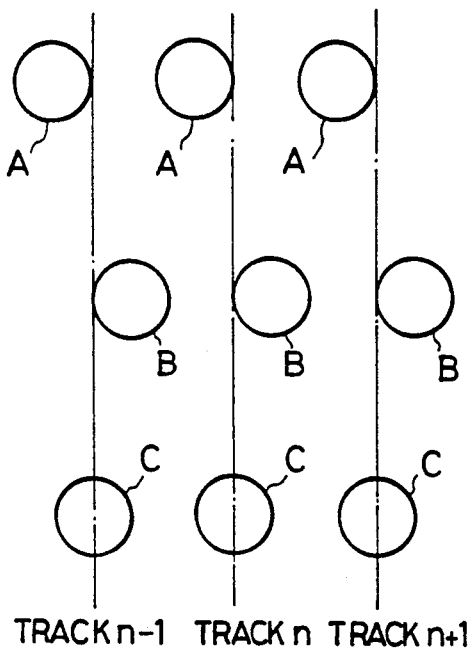
FIGS. 2a and 2b are respectively views of the optical disk and reproducing signals for explaining the general tracking servo method and a tracking servo method in the present invention.
Figure 2B:
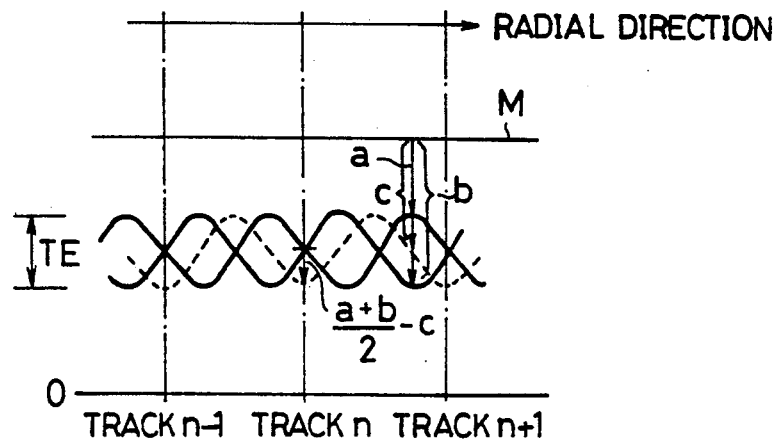

In the optical disk drive unit using the sampling servo system, the amplitudes of reproducing signals corresponding to the sample flags A, B and the mirror section of the optical disk are provided as shown in FIGS. 2a and 2b in which an axis of abscissa shows the radial direction of the optical disk. The magnitude of the tracking error signal corresponds to a flag difference A−B, i.e., TE.

In the above tracking servo method, the sum (a+b) of the respective amplitudes of the reproducing signals a and b is considered to be proportional to the tracking error signal TE. This tracking error signal is normalized by the sum (a+b) to constantly hold a gain of the tracking error signal TE. However, there is a case in which the sum (a+b) is not necessarily proportional to the tracking error signal. For example, when the sample flags A and B extend in the circumferential direction of the optical disk, their spatial frequencies in the circumferential direction of the optical disk are reproduced so that the amplitudes of the signals a and b are increased. However, the magnitude of the tracking error signal TE depends on the spatial frequencies of the sample flags A and B on the optical disk in the radial direction thereof so that no magnitude of the tracking error signal TE is almost changed. The relation between the tracking error signal and the sum (a+b) is also changed by the shape and depth of pits forming the sample flags A and B, or aberration characteristics of the light spot. Accordingly, a normalized tracking error signal indicative of TE/(a+b) is not necessarily constant at any time so that the gain of the tracking servo loop is changed.

Figure 3:
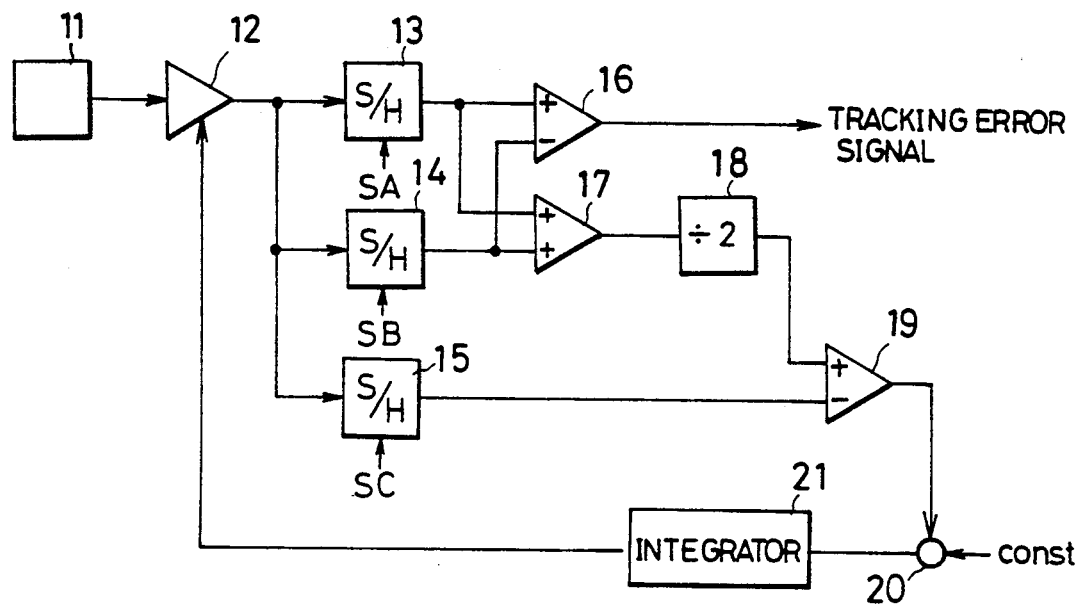
FIGS. 3 and 4 are block diagrams showing circuits used in tracking servo methods in accordance with respective embodiments of the present invention.

FIG. 3 shows a circuit used in a tracking servo method in accordance with one embodiment of the present invention.

In an optical disk drive unit using the above sampling servo system, an optical disk is rotated by a motor. An optical pickup irradiates light from a light source onto the optical disk as a light spot. Light reflected from the optical disk is photoelectrically converted by a photoelectric converter 11. A reproducing signal from this photoelectric converter 11 is amplified by a variable gain amplifier 12 and is inputted to three sample hold circuits 13, 14 and 15. The sample hold circuits 13, 14 and 15 respectively sample and hold the reproducing signal from the variable gain amplifier 12 by sample pulses of flags A, B and C at respective timings in conformity with those of reproducing signals corresponding to tracking sample flags A, B and a clock sample flag C on the optical disk. Thus, the sample hold circuits 13, 14 and 15 respectively obtain reproducing signals a, b and c corresponding to the tracking sample flags A, B and the clock sample flag C. A subtracter 16 performs a subtracting operation between the output reproducing signals a and b of the sample hold circuits 13 and 14 to obtain a tracking error signal. An adder 17 adds the output reproducing signals a and b of the sample hold circuits 13 and 14 to each other. An output signal of this adder 17 is divided by number 2 by an amplifier 18, thereby providing (a+b)/2. A subtracter 19 performs a subtracting operation between an output signal of the amplifier 18 and the output reproducing signal c of the sample hold circuit 15. An output signal of this subtracter 19 is provided as (a+b)/2−c as shown in FIG. 2b.

The output signal indicative of (a+b)/2−c of the subtracter 19 corresponds to half the magnitude TE of the tracking error signal when a disk portion near the tracking center 1 is scanned by the light spot. This output signal indicative of (a+b)/2−c is compared by a comparator 20 with a constant value. An output signal of this comparator 20 is integrated by an integrator 21. A gain of the above variable gain amplifier 12 is controlled by an output signal of the integrator 21. Accordingly, the gain of the variable gain amplifier 12 is controlled such that the value (a+b)/2−c is a constant value. The magnitude TE of the tracking error signal is twice this constant value so that a constant gain of the tracking error signal is obtained at any time. A tracking servo control operation with respect to the light spot is performed by the tracking error signal from the subtracter 16. Thus, the optical pickup or a portion thereof is moved in the radial direction of the optical disk and is positioned in the tracking center 1 on the optical disk.

Figure 4:
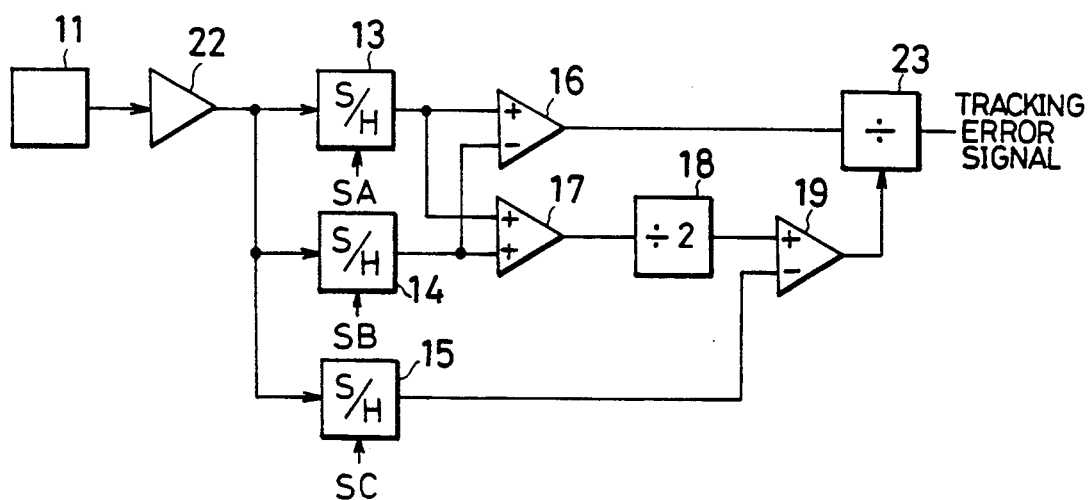

FIG. 4 shows a circuit used in a tracking servo method in another embodiment of the present invention. In FIG. 4, the same constructional portions as those in FIG. 3 are designated by the same reference numerals.

In this circuit, a fixed gain amplifier 22 is used instead of the above variable gain amplifier 12. A reproducing signal from a photoelectric converter 11 is amplified by the amplifier 22 and is inputted to three sample hold circuits 13, 14 and 15. Similar to the circuit shown in FIG. 3, a tracking error signal indicative of (a−b) is obtained from a subtracter 16 and a signal indicative of (a+b)/2−c is obtained from a subtracter 19. A divider 23 divides the tracking error signal indicative of (a−b) from the subtracter 16 by the output signal indicative of (a+b)/2−c from the subtracter 19. An output signal of this divider 23 is provided as (a−b)/{(a+b)/2−c}. The denominator of this value (a−b)/{(a+b)/2−c} is half the magnitude TE of the tracking error signal as mentioned above. Accordingly, the magnitude of the tracking error signal provided from the divider 23 is a constant value "2". Thus, a constant gain of the tracking error signal is obtained. A tracking servo control operation with respect to the light spot is performed by the tracking error signal from the divider 23. Thus, the optical pickup or a portion thereof is moved in the radial direction of the optical disk and is positioned in the tracking center 1 on the optical disk.

In the above embodiment, the signal indicative of the value (a+b)/2−c is used to normalize the tracking error signal. However, similar effects can be clearly obtained even when a signal indicative of a value K{(a+b)/2−c} multiplied by a constant value K with respect to this value (a+b)/2−c is used. Further, a signal provided by another flag arranged in the tracking center 1 may be used instead of the reproducing signal c provided by the clock sample flag C.

As mentioned above, in a tracking servo method in an optical disk drive unit in accordance with the present invention, a pair of tracking sample flags are arranged in positions shifted by predetermined distances from a tracking center on the optical disk. A signal in accordance with the difference in voltage level between two reproducing signals from the respective tracking sample flags is set to a tracking error signal. A light spot is positioned in the tracking center on the optical disk using this tracking error signal. In this tracking servo method, the above tracking error signal is normalized by a signal indicative of the difference between an average value of the above two reproducing signals and a signal reproduced from a sample flag approximately arranged in the tracking center on the optical disk. Accordingly, it is possible to provide a constant gain of the tracking error signal even when the optical characteristics of a clock sample flag and a reproducing optical system are changed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A tracking servo method used in an optical disk drive unit, said unit including an optical disk, said method comprising the steps of:

reproducing signals "a" and "b", respectively, from a pair of tracking sample flags arranged in positions shifted by predetermined distances from a tracking center at said optical disk;

reproducing a signal "c" from a sample flag approximately arranged at the tracking center on the optical disk;

providing a first signal in accordance with a difference between the signals "a" and "b";

providing a second signal in accordance with a difference between the signal "c" and an average value of the signals "a" and "b";

dividing the first signal by the second signal and deriving a tracking error signal from the result of said division; and positioning a light spot at the tracking center of said optical disk in accordance with said tracking error signal.

* * * * *